US009045117B2

(12) United States Patent
Wakao (10) Patent No.: US 9,045,117 B2
(45) Date of Patent: Jun. 2, 2015

(54) ROAD SURFACE CONDITION ESTIMATING METHOD, VEHICLE CONTROL METHOD, AND ROAD SURFACE CONDITION ESTIMATING APPARATUS

(75) Inventor: Yasumichi Wakao, Kodaira (JP)

(73) Assignee: BRIDGESTONE CORPORATION, Tokyo (JP)

(*) Notice: Subject to any disclaimer, the term of this patent is extended or adjusted under 35 U.S.C. 154(b) by 48 days.

(21) Appl. No.: 13/472,150

(22) Filed: May 15, 2012

(65) Prior Publication Data
US 2012/0296493 A1 Nov. 22, 2012

(30) Foreign Application Priority Data

May 16, 2011 (JP) ................................. 2011-109380

(51) Int. Cl.
*G01M 17/00* (2006.01)
*B60T 8/172* (2006.01)
(Continued)

(52) U.S. Cl.
CPC ............. *B60T 8/172* (2013.01); *B60T 2210/12* (2013.01); *B60W 40/06* (2013.01); *B60C 11/1369* (2013.01); *B60C 2019/004* (2013.01); *B60W 40/064* (2013.01); *B60W 40/068* (2013.01); *B60W 2050/0057* (2013.01); *B60W 2422/10* (2013.01); *B60W 2422/70* (2013.01); *B60W 2520/28* (2013.01)

(58) Field of Classification Search
CPC . B60T 2210/12; B60T 8/172; B60T 2230/02; B60W 2250/402; B60W 10/184; B60R 25/04; B60R 25/2081; G08G 1/0962; G08G 1/16

USPC .................. 701/1, 29, 29.1, 80; 340/905, 445; 73/146

See application file for complete search history.

(56) References Cited

U.S. PATENT DOCUMENTS 6,012,499 A * 1/2000 Masaoka ................... 152/209.18
6,668,637 B2 * 12/2003 Ono et al. .................... 73/146.5
(Continued)

FOREIGN PATENT DOCUMENTS

EP         2143613 A1    1/2010
JP    2010-274906 A    12/2010
(Continued)

OTHER PUBLICATIONS

Extended European Search Report, dated Sep. 20, 2012, issued in corresponding European Application No. 12167899.9.

*Primary Examiner* — Tuan C. To
*Assistant Examiner* — Shardul Patel
(74) *Attorney, Agent, or Firm* — Sughrue Mion, PLLC (57) ABSTRACT

The condition of a road surface on which a vehicle is traveling is estimated accurately, using a tire having a general variable-pitch tire pattern for detection of a road surface condition. The tire for detection of a road surface condition has rows of blocks, the total number N of the circumferentially disposed blocks being 10 or more and the number n of lug grooves, each provided with a joining section connecting circumferentially adjacent blocks, being in the range of $(N/2) \leq n \leq (N-5)$. The vibrations of the tire are detected by an acceleration sensor and are subjected to a rotational order ratio analysis by a rotational order ratio analyzing unit. And the road surface condition is estimated by comparing the amplitude P of the rotational order component of the tire vibrations extracted by a rotational order component extracting unit with a predetermined threshold value K.

6 Claims, 5 Drawing Sheets

(51) Int. Cl.
  *B60W 40/06* (2012.01)
  *B60C 11/13* (2006.01)
  *B60W 40/064* (2012.01)
  *B60W 40/068* (2012.01)
  *B60W 50/00* (2006.01)

(56) References Cited

U.S. PATENT DOCUMENTS

| | | | | |
|---|---|---|---|---|
| 6,823,244 | B2 * | 11/2004 | Breed | 701/29.7 |
| 6,959,593 | B2 * | 11/2005 | Mancosu et al. | 73/146 |
| 7,203,579 | B2 * | 4/2007 | Yokota et al. | 701/29.2 |
| 7,438,100 | B2 * | 10/2008 | Hashimoto | 152/209.15 |
| 8,122,762 | B2 * | 2/2012 | Wakao | 73/146 |
| 2002/0112800 | A1 * | 8/2002 | Suzuki et al. | 152/209.3 |
| 2002/0162389 | A1 * | 11/2002 | Yokota et al. | 73/146 |
| 2005/0085987 | A1 * | 4/2005 | Yokota et al. | 701/80 |
| 2008/0149242 | A1 * | 6/2008 | Oyama | 152/209.19 |
| 2012/0167687 | A1 * | 7/2012 | Wakao | 73/579 |
| 2013/0020001 | A1 * | 1/2013 | Nishi | 152/209.18 |

FOREIGN PATENT DOCUMENTS

| | | |
|---|---|---|
| JP | 2010274906 A | 12/2010 |
| WO | WO 2008136303 A1 * | 11/2008 |
| WO | 2011/030700 A1 | 3/2011 |

* cited by examiner

ROAD SURFACE CONDITION ESTIMATING METHOD, VEHICLE CONTROL METHOD, AND ROAD SURFACE CONDITION ESTIMATING APPARATUS

CROSS-REFERENCES TO RELATED APPLICATIONS

The present application is based on Japanese Priority Application No. 2011-109380 filed on May 16, 2011 with the Japanese Patent Office, the entire contents of which are hereby incorporated by reference.

BACKGROUND OF THE INVENTION

1. Field of the Invention

The present invention relates to a method and apparatus for estimating the condition of a road surface on which a vehicle is traveling and a method for vehicle control.

2. Description of the Related Art

For improved travel stability of a vehicle, it is desired that the coefficient of friction between the tire and the road surface (surface friction coefficient) or the ground contact state of the tire is estimated accurately and the data thus obtained is fed back to vehicle control. If the surface friction coefficient or the ground contact state of the tire can be estimated in time, then it will be possible to operate such advanced control as ABS (antilock braking system) braking before any danger avoidance action, like braking, accelerating, or steering, is taken. With such facility, there will be a marked boost in the safety of vehicular operation.

In a method for estimating a surface friction coefficient, such as one disclosed in Japanese Unexamined Patent Application Publication No. 2010-274906, a tire used for the estimation of a road surface condition has deformable structural areas including sipes formed at a specific pitch P circumferentially in the shoulder region. And a vibration spectrum is acquired by detecting the vibrations of the tread of the moving tire by an acceleration sensor. At the same time, a detection frequency is calculated from the wheel speed measured by a wheel speed sensor and the pitch P. Then a road surface condition is estimated, using the amplitude of the vibration level caused by the deformable structural areas at the detection frequency.

However, a problem with the above-described conventional tire for estimation of a road surface condition is its well-defined tread pattern which restricts the freedom of tread pattern design.

The present invention has been made to solve the above-described problems, and an object thereof is to provide a method and apparatus for accurately estimating the condition of a road surface on which a vehicle is traveling, and a vehicle control method, using a tire having a common variable-pitch tire pattern for detection of a road surface condition.

SUMMARY OF THE INVENTION

The present invention provides a method for estimating a road surface condition. The method includes the steps of detecting vibrations of a tire having a block pattern, performing a rotational order ratio analysis on the tire vibrations, and estimating the current road surface condition from the amplitude of a rotational order component of the analyzed tire vibrations. The tire used in the estimation of a current road surface condition has at least one row of blocks, of which the total number N of the circumferentially disposed blocks is 10 or more. The row of blocks has the number n of lug grooves, each provided with a joining section connecting circumferentially adjacent blocks. The number n is in the range of $(N/2) \leq n \leq (N-5)$, and the order of the rotational order component for estimation of the road surface condition is $(N-n)$.

Accordingly, a tire for the detection of a road surface condition may be fabricated with a simple design change of providing joining sections on the tire with a common block pattern. Also, the condition of a road surface on which the tire is running can be estimated with accuracy because there is distinct change in the amplitude of the rotational order component of the tire whose order is $(N-n)$, relative to the condition of the road surface.

In a rotational order ratio analysis (called rotational order analysis also) employed in the present invention, a power spectrum with the horizontal axis representing the rotational orders is obtained by performing an FFT (Fast Fourier Transform) on the signals of vibrations of a rotating body sampled in synchronism with the rotation speed. The rotational order n can be expressed as $n=360/\theta$ where $\theta$ (degree) is the angle of one pitch of vibrations. Since the rotational order component used in the estimation of a road surface condition in the present invention has a fixed phase of pitch components relative to the angle of rotation, the method provides a more accurate detection of vibration components than the frequency analysis which is based on measurement by time unit.

The present invention also provides a vehicle control method for controlling the traveling performance of a vehicle based on a road surface condition estimated by any of the above-mentioned methods.

Thus, the safety of vehicular operation will be further enhanced if the traveling performance of a vehicle is controlled using the ABS braking and other functions based on a road surface condition thus estimated.

The present invention also provides an apparatus for estimating a road surface condition. The apparatus includes a surface condition detecting tire, a vibrations detecting unit, a rotational order components extracting unit, and a road surface condition estimating unit.

The tire has at least one row of blocks, and the total number N of the circumferentially disposed blocks is 10 or more. The row of blocks has the number n of lug grooves, each provided with a joining section connecting circumferentially adjacent blocks, n being in the range of $(N/2) \leq n \leq (N-5)$. The vibrations detecting unit, which is disposed in an unsprung portion of a vehicle, detects vibrations of the tire tread propagated to the unsprung portion from the tire. The rotational order components extracting unit performs a rotational order ratio analysis on the vibrations of the tire tread detected by the vibrations detecting unit and extracts the amplitude of a rotational order component whose order is $(N-n)$. And the road surface condition estimating unit estimates a current road surface condition from the extracted amplitude of the rotational order component.

With the structure as described above, the apparatus accomplishes accurate estimation of a current road surface condition without the loss the characteristics of the block pattern, such as braking and acceleration characteristics and draining characteristics, that existed before the design change. At the same time, the apparatus can reduce the chances of estimation errors due to the resonant vibrations of the tire changing with the rotation speed of the wheel. Also, the capacity to estimate a current road surface condition accurately without the sensor installed on the tire improves the durability of the sensor.

It is to be understood that the foregoing summary of the invention does not necessarily recite all the features essential to the invention, and subcombinations of all these features are intended to be included in the invention.

DESCRIPTION OF THE PREFERRED EMBODIMENTS

The invention will now be described based on preferred embodiments which do not intend to limit the scope of the claims of the present invention but exemplify the invention. All of the features and the combinations thereof described in the embodiments are not necessarily essential to the invention.

Figure 1:
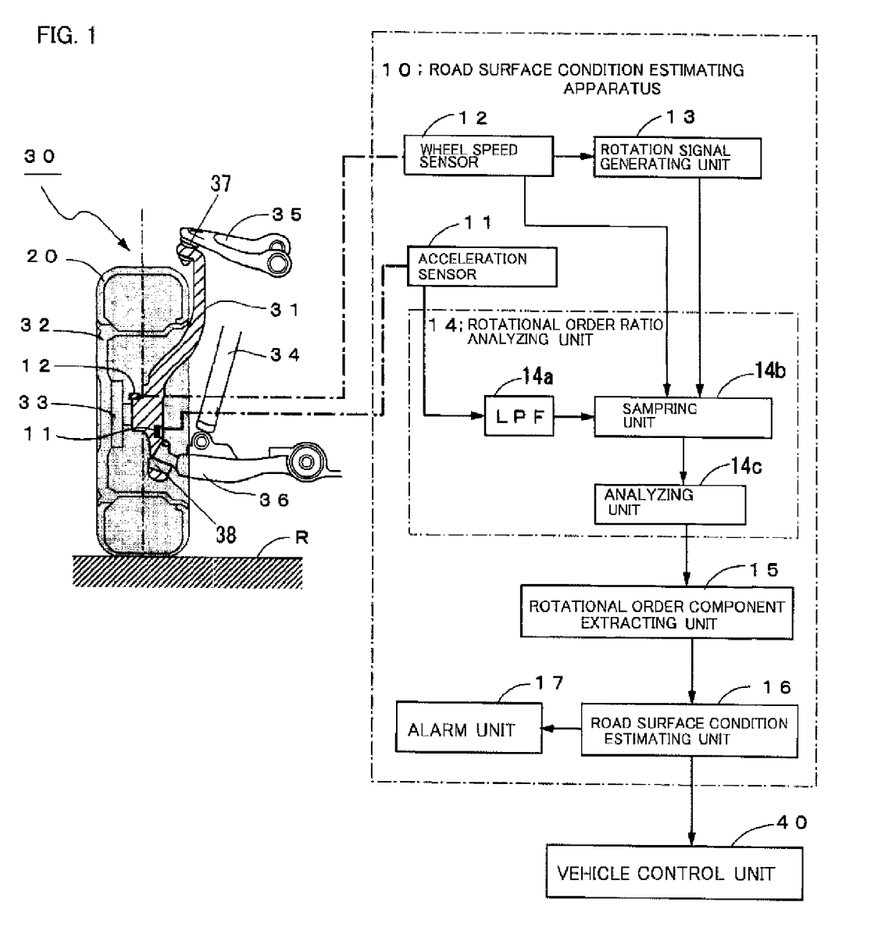
FIG. 1 is a functional block diagram showing a structure of a road surface condition estimating apparatus in accordance with the present invention.

FIG. 1 is a functional block diagram of a road surface condition estimating apparatus 10 according to an embodiment of the present invention.

The road surface condition estimating apparatus 10 includes an acceleration sensor 11 for detecting vibrations, a wheel speed sensor 12 for detecting wheel speed, a rotation signal generating unit 13, a rotational order ratio analyzing unit 14, a rotational order components extracting unit 15, a road surface condition estimating unit 16, an alarm unit 17, and a surface condition detecting tire (hereinafter referred to as tire) 20.

Figure 2:
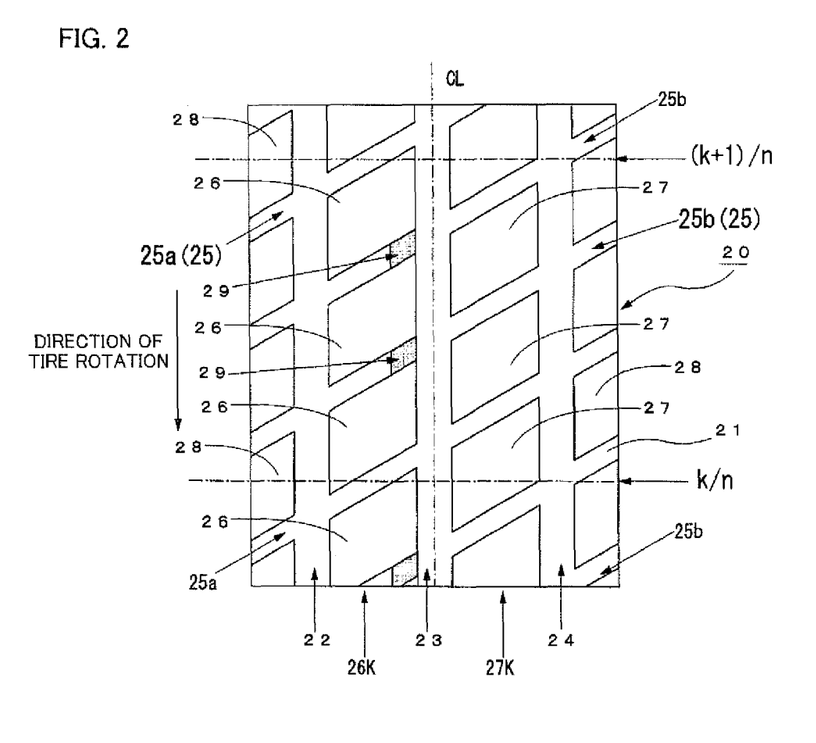
FIG. 2 is an illustration showing an example of a tread pattern.

FIG. 2 is an illustration showing an example of a tread pattern of the tire 20. The tire 20 has circumferential grooves 22 to 24 formed in a tire tread 21 and extending circumferentially, lug grooves 25 (25a, 25b) extending in a direction intersecting with the circumferential grooves 22 to 24, first and second center blocks 26, 27 defined by the circumferential grooves 22, 23 and the lug grooves 25 and the circumferential grooves 23, 24 and arranged on either side the tire center line CL, and a plurality of shoulder blocks located axially outside the circumferential grooves 22, 24.

Hereinafter, the circumferential groove 23 is referred to as the center groove, and the circumferential grooves 22, 24 as the shoulder grooves.

The first and second center blocks 26, 27, respectively, constitute the first and second rows of blocks 26K, 27K, each having a total number N of 10 or more blocks arranged along the circumference of the tire.

In the present embodiment, the first row of blocks 26K is circumferentially divided into n divisions, and joining sections 29, each joining adjacent blocks 26, 26, are provided in the lug grooves 25b, which are not the lug grooves 25a located between the blocks closest to the dividing lines indicated by the horizontal arrows in FIG. 2. The number of lug grooves 25a, having no joining sections 29 therein, is (N−n), where n is the number of lug grooves 25b having the joining sections 29 provided therein.

In the present embodiment, N−n is set in the following range:

$$5 \leq N-n \leq N/2 \tag{1}$$

For example, 60 for the total number N of blocks and 23 for N−n satisfy the above expression (1).

Figure 3:
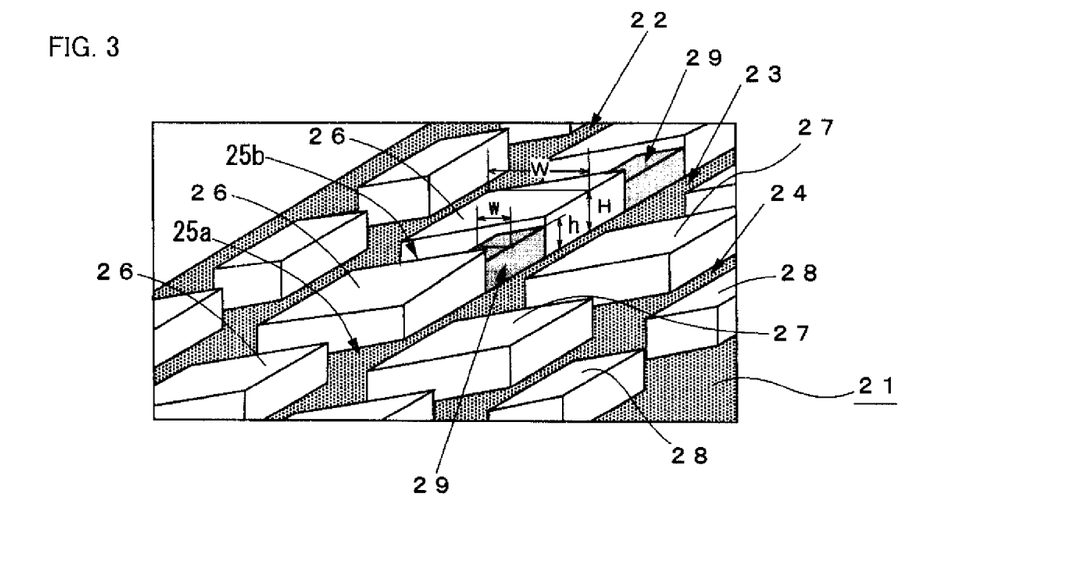
FIG. 3 is a feature perspective view of a tread.

The joining sections 29, as shown in FIG. 3, are each a block-shaped rubber member whose height h from the bottom of the lug groove 25a is equal to or less than the height H of the blocks 26, 26 joined to each other and whose axial length w is equal to or less than ½ of the axial length W (or length along the lug groove 25a) of the blocks 26, 26. The joining sections 29 are of the same rubber material as the blocks 26, 26.

Also, in the present embodiment, the blocks 26 and the joining sections 29 are each parallelogram-shaped members as seen in a planar view, which have the sides parallel to the extending direction of the lug groove 25a and the sides parallel to the center groove 23. And the joining sections 29 are disposed on the center groove 23 side in the lug grooves 25b.

The acceleration sensor 11, which is attached to a knuckle 31 as shown in FIG. 1, detects the vibrations of the tire 20 (hereinafter referred to as tire vibrations) which are transmitted to the knuckle 31 via a wheel 32 and a wheel hub 33. The detecting direction of the acceleration sensor 11 is the fore-aft direction of the tire.

The knuckle 31 is a nonrotating-side member (unsprung member) of a wheel unit 30, which is coupled via a bearing to the wheel hub 33 rotating together with the wheel 32 having the tire 20 fitted thereon. And mounted on this knuckle 31 are a not-shown braking device and the like. The knuckle 31 is coupled to the upper and lower arms 35, 36 of the vehicle suspension having a suspension member 34, via shock-absorbing members 37, 38 such as rubber bushes.

Note that if the acceleration sensor 11 is installed on any of the members, such as the upper and lower arms 35, 36, which are coupled to the wheel 32 via the shock-absorbing members 37, 38, the detection accuracy of the vibrations of the tread 21 will be compromised on account of the damper effect of the shock-absorbing members 37, 38. Hence, by installing the acceleration sensor 11 on the wheel 32 side of the shock-absorbing members 37, 38 when it is attached to the unsprung portion of the vehicle, it is possible to detect the vibrations transmitted to the unsprung portion of the vehicle from the tire 20 with greater accuracy.

The wheel speed sensor 12 detects the rotational speed of a wheel (hereinafter referred to as wheel speed). Employed in this embodiment to detect the angle of rotation of the wheel is a wheel speed sensor of a known electromagnetic induction type, which has a rotor having gear teeth on its periphery and rotating together with the wheel, a yoke constituting a magnetic circuit in combination with the rotor, and a coil for detecting flux changes of the magnetic circuit. The yoke and the coil are mounted on the knuckle 31. It should be noted that the wheel speed sensor 12 that can be used may be one combining a ring multipolar magnet and a magnetoresistance element or of some other structure. The arrangement may also be such that the rotational speed of a not-shown transmission is detected as the wheel speed.

The rotation signal generating unit 13 generates and outputs a pulse signal that rises at the zero-cross point of the output of the wheel speed sensor 12. The pulse number of the pulse signal generated per a single revolution of the tire is twice the number of gear teeth on the rotor or the number of magnetic poles of the ring multipolar magnet. Thus the wheel speed can be detected by counting the pulse number, and also the pulse signal outputted from the rotation signal generating unit 13 can be used as a sampling clock. Since the sampling clock is synchronized with the rotational speed, sampling of tire vibrations detected by the acceleration sensor 11 by the use of the sampling clock realizes a constant number of samples per single revolution of the tire irrespective of the wheel speed. Viewed temporally, however, the faster the wheel speed is, the narrower the sampling interval will be, and the slower the wheel speed is, the wider the sampling interval will be.

The rotational order ratio analyzing unit 14 includes a lowpass filter 14a, a sampling unit 14b, and an analyzing unit 14c.

The lowpass filter 14a not only removes high-frequency components from the tire vibrations detected by the acceleration sensor 11 but also prevents the occurrence of ailiasing in the rotational order ratio analysis.

The sampling unit 14b samples tire vibrations detected by the acceleration sensor 11, using a sampling clock outputted by the rotation signal generating unit 13.

The analyzing unit 14c finds a vibration spectrum (hereinafter referred to as rotational order spectrum) by performing an FFT processing on the vibration waveform of the thus sampled tire vibrations. Note that whereas the horizontal axis of a vibration spectrum (frequency spectrum) of the vibration waveform measured at constant time intervals is frequency, the horizontal axis of a rotational order spectrum, which is a vibration spectrum of the vibration waveform measured at constant rotation intervals, is rotational order.

The rotational order components extracting unit 15 extracts the peak value P of the 23rd order component, which is the vibration level of the (N−n)th rotational order (23rd order here) to be used in the estimation of a road surface condition, and outputs the value to the road surface condition estimating unit 16.

The road surface condition estimating unit 16 compares the peak value P of the 23rd order component against a predetermined threshold value K and estimates the current road surface to be a low μ surface when the peak value P is smaller than the threshold value K.

If the current road surface is estimated to be a low μ surface, the road surface condition estimating unit 16 outputs a signal indicating a low μ surface to the alarm unit 17.

The alarm unit 17 may be installed near the driver's seat. When a signal indicating a low μ surface is inputted, the alarm unit 17 warns the driver of the current road surface being a low μ surface by lighting or flashing a warning LED. The arrangement may also be such that the warning is given by an alarm sound of a warning buzzer or by a combination of a warning buzzer and LED.

Figure 4:
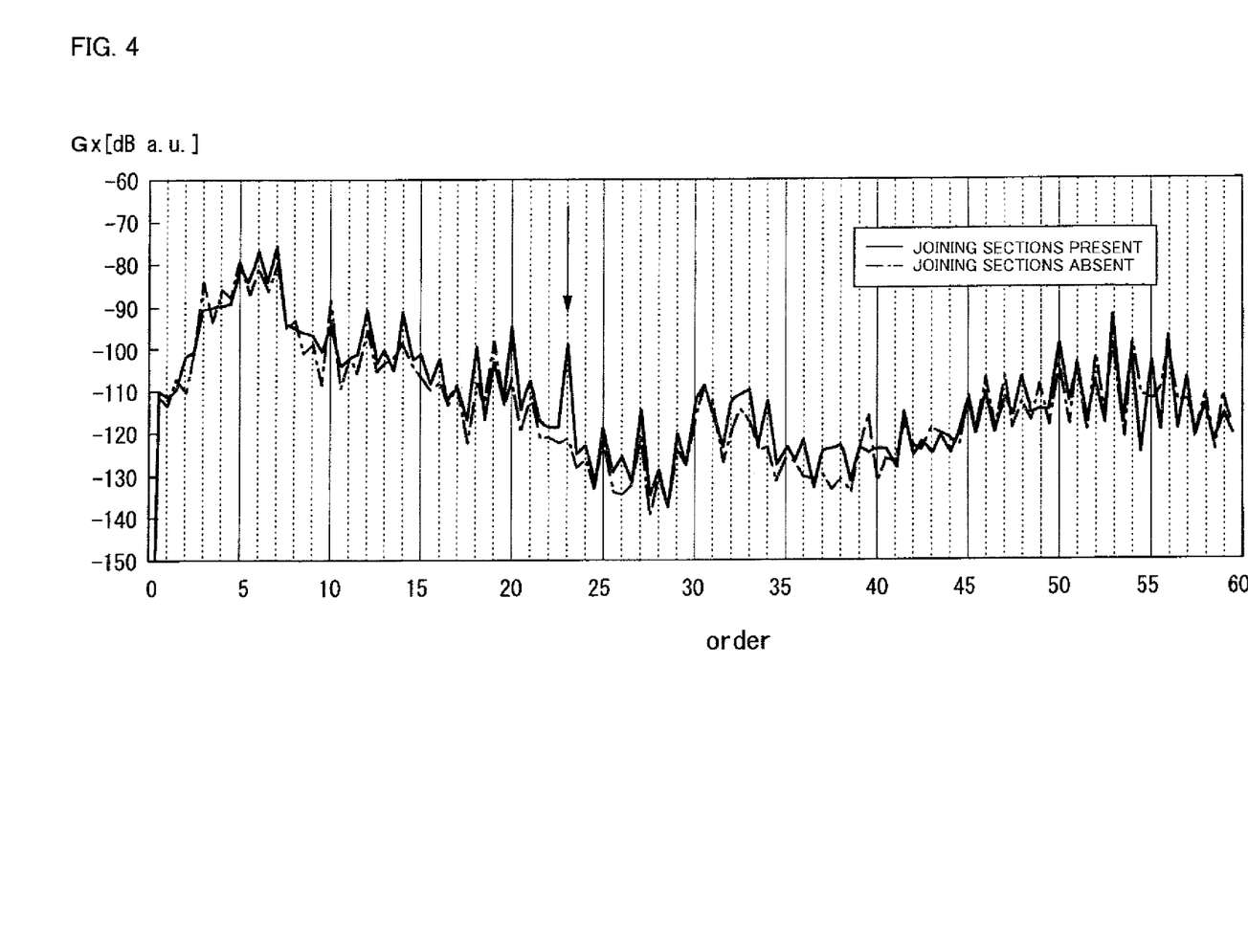
FIG. 4 is a diagram showing the differences in rotational order spectrum between the presence and the absence of joining sections.

FIG. 4 is a diagram showing differences in rotational order spectrum derived by a rotational order ratio analysis between the presence and the absence of joining sections 29. The chain line represents a rotational order spectrum of a tire having rows of N blocks circumferentially without the joining sections 29, and the solid line that of an identical tire provided with the joining sections 29 in n lug grooves 25b. And both the rotational order spectra are those obtained when the test vehicle was operated on a high μ surface (μ≈1.0). Also, note that N−n=23.

The traveling speed of the vehicle was 60 km/h. The peak of the 23rd order indicated by an arrow in FIG. 4 corresponds to the occurrence of 23 vibrations per revolution of the tire.

With the tire provided with the joining sections 29, it can be seen that the rotational order component of the 23rd order of tire vibration rises high because the lug grooves 25a have no joining sections 29 therein.

In other words, in the blocks 26 whose trailing-edge side faces the lug groove 25a not provided with a joining section 29, the stiffness of the block decreases at the time of ground contact and the deformation of the block on the trailing-edge side increases. In contrast to this, in the blocks 26 whose trailing-edge side faces the lug groove 25b provided with a joining section 29, there is a smaller amount of deformation of the block on the trailing-edge side because the stiffness of the block is relatively high at the time of ground contact. And since the repetition of this deformation occurs periodically with tire rotation, the vibrations corresponding to it can be detected as an order component. It should be noted that the rotational order spectrum has also a large number of peaks. This is because the blocks and lug grooves of the block pattern of the tire used in deriving the rotational order spectra as shown in FIG. 4 are not of the simple shapes as shown in FIG. 2 but of the shapes designed in consideration of braking and acceleration characteristics, steering stability, draining characteristics, and the like.

Figure 5:
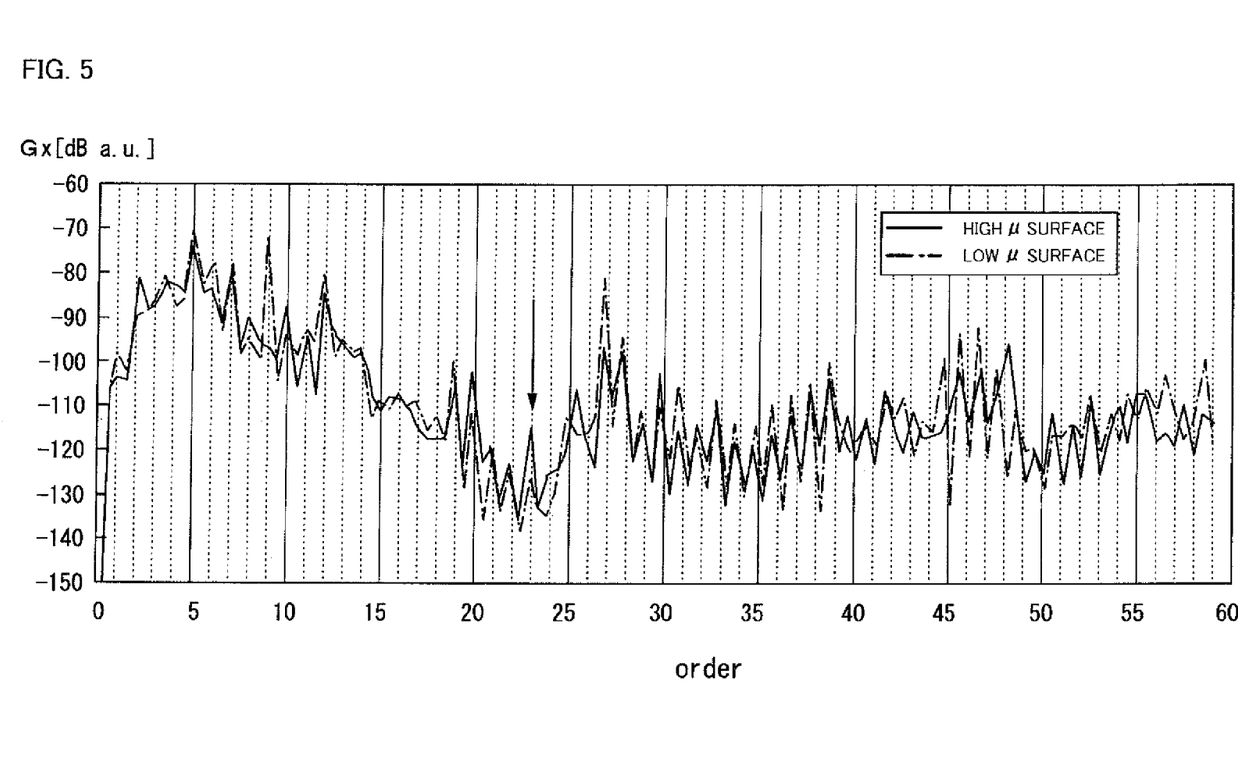
FIG. 5 is a diagram comparing a rotational order spectrum for a high μ surface and a rotational order spectrum for a low μ surface.

FIG. 5 is a diagram showing an example of differences in rotational order spectrum between different road surfaces. The solid line in the graph represents a rotational order spectrum obtained when the test vehicle was operated on a high μ surface (μ≈1.0), and the chain line that obtained when the vehicle was operated on a low μ surface (μ≈0.2). In this example, the high μ surface used in the test was a dry asphalt surface, and the low μ surface was an icy road surface.

On a slippery road, the angle between the block and the road surface at the time of ground contact gets smaller because the effect of the road surface gripping the tire is weak. And the smaller angle between the block and the road surface reduces the deformation of the tread such that there will be a smaller difference in block behavior attributable to the presence or the absence of the joining sections 29. As a result, the rotational order component of the 23rd order caused by the difference in the rigidity of blocks will be smaller on a slippery surface as shown in FIG. 5. Accordingly, it is possible to estimate a road surface condition by comparing the rotational order component of the 23rd order with a predetermined threshold value.

Now a description will be given of a method for estimating a road surface condition according to the present embodiment.

First a vibration waveform of a tire 20 which has been transmitted to the knuckle 31 is detected by an acceleration sensor 11, and at the same time the wheel speed is detected by a wheel speed sensor 12.

Next the vibration waveform of the tire 20 is subjected to a rotational order ratio analysis by a rotational order ratio analyzing unit 14, thereby obtaining a rotational order spectrum with the horizontal axis representing rotational orders as shown in FIG. 5.

The rotational order spectrum is derived by sampling the tire vibrations detected by the acceleration sensor 11 relative to the wheel speed data outputted from a rotation signal generating unit 13 and the data pulse signal of the wheel speed and then applying an FFT processing thereto.

In the estimation of a road surface condition, a peak value P, which is the amplitude of the rotational order component of the 23rd order found from the rotational order spectrum by a rotational order component extracting unit 15, is compared with a threshold value K, which has been determined beforehand, so as to estimate whether the current road surface is a low μ surface or not.

When the current road surface is estimated to be a low μ surface, the driver is warned of the current road surface being a low μ surface by lighting or flashing a warning LED. At the same time, the information on the road surface R being a low μ surface is outputted to a vehicle control unit 40 so as to effect a vehicle control by ABS or the like. Thus, it will be possible to operate such advanced control as with ABS braking, providing further improvement in the safety of vehicular operation.

In the foregoing embodiment, the number of blocks constituting the first row of blocks 26K is N=60, and the joining sections 29 are provided such that the order of the rotational order component to be detected is N−n=23. However, the number N of blocks and the number n of the lug grooves 25b having the joining sections 29 therein are not limited to 60 and 23, respectively. The numbers N and n may be usable as long as they satisfy N≥10 and 5≤N−n≤N/2.

Also, the row of blocks where the joining sections 29 are provided is not limited to the first row of blocks 26K. The joining sections 29 may be provided in the second row of blocks 27K or in both of the first row of blocks 26K and the second row of blocks 27K. Or they may be provided in a row of blocks constituting shoulder blocks 28.

Also, when the joining sections 29 are provided in a plurality of rows of blocks, the number n of the lug grooves 25b may differ from one row of blocks to the other. In such a case, there may be two or more orders of the rotational order components to be detected. Hence, peak values Pj of orders j are to be compared with their respective threshold values Kj. And the arrangement may, for instance, be such that a current road surface condition is estimated to be a low μ surface when 70% or more of the peak values Pj are smaller than the threshold values Kj.

Also, in the foregoing embodiment, the axial length w of the joining section 29 is equal to or less than ½ of the axial length W of the block 26. However, the axial length w of the joining section 29 may be equal to or less than the depth of the lug groove 25. In any case, the joining sections 29 may be of any shape or size so long as they can reduce the deformation of the blocks joined with the joining sections 29 and can minimize the change in tire behavior due to the design change. This minimizes the change in tire behavior caused by the design change of providing the joining sections. As a result, the condition of a road surface on which the tire is running can be estimated accurately without the loss of the characteristics of the block pattern, such as braking and acceleration characteristics and draining characteristics, that existed before the design change.

Also, the location of the joining sections 29 is not limited to the center groove 23 side of the blocks 26. The joining sections 29 may be provided in the axially intermediate part of the blocks 26. This will further improve the accuracy in estimating a road surface condition by increasing the change in the amplitude of the rotational order component due to a change in road surface.

Also, in the foregoing embodiment, the output of the wheel speed sensor 12 is sent to the rotation signal generating unit 13, thereby obtaining the number of revolutions of the tire. At the same time, the sampling clock is outputted to the rotational order ratio analyzing unit 14. However, if the vehicle has a vehicle control unit 40 with a CAN (controller area network) function, then it is preferable that the wheel speed is obtained from the CAN.

Also, in the foregoing embodiment, it is estimated whether the current road surface is a low μ surface or not. But the arrangement may, for instance, be such that two threshold values K are provided to classify the road surface condition into three conditions. That is, the road surface may be estimated to be a low μ surface when the peak value P extracted by the rotational order components extracting unit 15 is equal to or smaller than the first threshold value, a middle μ surface when the peak value P is larger than the first threshold value and equal to or smaller than the second threshold value, which is larger than the first threshold value, and a high μ surface when the peak value P is larger than the second threshold value.

Example

The tire prepared for the test was a winter tire of size 225/55R17. The tire had 23 circumferential divisions along the tread center region, and joining sections, each joining adjacent blocks, were formed in the lug grooves, which were not the lug grooves located between the blocks closest to the dividing lines indicated by the horizontal arrows in FIG. 2. A road surface condition estimating apparatus according to the present invention was installed on a vehicle having the above-described tire fitted on the left front wheel. And this test vehicle was driven at a speed of 60 km/h from a smooth asphalt road surface ($\mu \approx 1.0$) onto a low μ test road surface ($\mu \approx 0.2$). In doing so, the rotational order spectra were derived by measuring accelerations and wheel speeds on the asphalt road surface and the low μ test road surface. The rotational order spectra obtained for the respective road surfaces were found by averaging the five times of data measurements from 10-meter runs.

As shown in FIG. 4, there are only minor changes in many of the peaks of the rotational order spectra, but the 23rd order component, which is an order component attributable to lug grooves without joining sections, shows a distinct decrease on the low μ test road surface. Hence, it is evident that a low μ surface can be detected from the vibration strength of the 23rd order. Thus, it has been confirmed that a low μ surface can be determined by setting a threshold value for the amplitude of the order component.

According to the present invention described herein, the condition of a road surface on which a vehicle is traveling can be estimated with a simple design change of providing joining sections on a tire with a common block pattern. This will enhance the freedom of tire pattern designing. Also, this will accomplish both the improvement in tire performance and the improvement in the estimation accuracy of a road surface condition.

In the foregoing specification, the invention has been described with reference to specific embodiments thereof. However, the technical scope of this invention is not to be considered as limited to those embodiments. It will be evident to those skilled in the art that various modifications and changes may be made thereto without departing from the broader spirit and scope of the invention. It will also be evident from the scope of the appended claims that all such modifications are intended to be included within the technical scope of this invention.

What is claimed is:

1. A method for estimating a road surface condition, comprising the steps of:
   detecting vibrations of a tire having a block pattern by a vibration detecting unit;
   performing a rotational order ratio analysis on the tire vibrations by a rotational order components extracting unit; and
   estimating a current road surface condition from an amplitude of a rotational order component of the analyzed tire vibrations by a road surface condition estimating unit,
   wherein the tire has at least one row of blocks and lug grooves, each lug groove being disposed between adjacent blocks of the row of blocks, the total number N of the circumferentially disposed blocks and corresponding lug grooves being 10 or more, wherein a number n of lug grooves are provided with a joining section connecting circumferentially adjacent blocks, a relation between n and the total number N satisfying the range of (N/2)≤n≤(N−5), and wherein the order of the rotational order component for estimation of the road surface condition is (N−n).

2. The method for estimating a road surface condition according to claim 1, wherein the height of the joining section from the bottom of the lug groove is equal to or less than the height of the block, and the axial length of the joining section is equal to or less than ½ of the width of the block or equal to or less than the depth of the lug groove.

3. The method for estimating a road surface condition according to claim 1, wherein the row of blocks is formed in the central area of a tire tread.

4. The method for estimating a road surface condition according to claim 1, wherein the vibrations of the tire are detected in an unsprung portion of a vehicle by the vibrations detecting unit.

5. A vehicle control method, comprising:
controlling the traveling performance of a vehicle based on a road surface condition estimated by claim 1.

6. An apparatus for estimating a road surface condition, comprising:
a tire for estimation of a road surface condition, the tire having at least one row of blocks and lug grooves, each lug groove being disposed between adjacent blocks of the row of blocks, the total number N of the circumferentially disposed blocks and corresponding lugs grooves being 10 or more, a number n of the lug grooves, are provided with a joining section connecting circumferentially adjacent blocks, a relation between n and the total number N satisfying the range of (N/2)≤n≤(N−5);

a vibrations detecting unit disposed in an unsprung portion of a vehicle for detecting vibrations of a tire tread propagated to the unsprung portion from the tire;

a rotational order components extracting unit for performing a rotational order ratio analysis on the vibrations of the tire tread detected by the vibrations detecting unit and extracting the amplitude of a rotational order component whose order is (N−n); and a road surface condition estimating unit for estimating a current road surface condition from the extracted amplitude of the rotational order component.

\* \* \* \* \*